United States Patent
Washiro et al.

(10) Patent No.: US 9,964,938 B2
(45) Date of Patent: May 8, 2018

(54) FIELD DEVICE CONFIGURATION SYSTEM AND METHOD

(71) Applicant: YOKOGAWA ELECTRIC CORPORATION, Musashino-shi, Tokyo (JP)

(72) Inventors: Mitsuhiro Washiro, Singapore (SG); Alexander Alejaga, Singapore (SG); Jian Liang, Singapore (SG)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 379 days.

(21) Appl. No.: 14/712,230

(22) Filed: May 14, 2015

(65) Prior Publication Data
US 2016/0334773 A1    Nov. 17, 2016

(51) Int. Cl.
*G05B 19/042*    (2006.01)

(52) U.S. Cl.
CPC ............ *G05B 19/0426* (2013.01); *G05B 2219/25065* (2013.01); *G05B 2219/25217* (2013.01); *G05B 2219/25428* (2013.01)

(58) Field of Classification Search
CPC .................................................. G05B 19/0426
See application file for complete search history.

(56) References Cited

U.S. PATENT DOCUMENTS

| 2008/0273486 A1 | 11/2008 | Pratt et al. |
| 2009/0276486 A1 | 11/2009 | Tandon et al. |
| 2012/0065748 A1 | 3/2012 | Nixon et al. |

OTHER PUBLICATIONS

Communication dated Oct. 12, 2016 from the European Patent Office in counterpart Application No. 16167117.7.

*Primary Examiner* — Mohammad Ali
*Assistant Examiner* — Vincent Chang
(74) *Attorney, Agent, or Firm* — Sughrue Mion, PLLC (57) ABSTRACT

A system includes, but not limited to, at least one processor, a retriever configured to retrieve a first field device parameter belonging to burst mode settings from at least one field device connected to a field network, and a transmitter. The transmitter is configured to transmit a second field device parameter belonging to burst mode settings to the at least one field device, based on at least a configuration file. The second field device parameter being associated with the first field device parameter. The first field device parameter includes, not limited to, a first determiner that determines whether to enable or disable a first automated transmission of a first process related variable of the field device, the first process related variable is one of a process variable and a diagnostic result in a burst mode. The retriever, the comparator and the transmitter are implemented by the at least one processor.

7 Claims, 8 Drawing Sheets

FIELD DEVICE CONFIGURATION SYSTEM AND METHOD

BACKGROUND

Technical Field

The disclosure generally relates to a system and a method of field device configuration in an industrial plant.

BACKGROUNDS

Field Device

Field devices are sensing devices such as flow gauges and temperature sensors, valve devices such as flow amount control valves and open/close valves, controllers or actuators such as fans and motors, and other devices installed in an industrial plant or factory. The field devices measure process variables, such as pressure, flow amount, of processes in the plant. A process variable is a value measured by the field device. The field device is configured to measure the process variable.

Conventional existing field devices only display process variables on the field devices. Intelligent field device includes an autonomous diagnostic function to perform a diagnosis on itself (self-diagnosis function) and a calculation function to calculate process variables like a function block.

The intelligent field device is configured to perform transmission and/or reception of various signals such as measurement signals or control signals via wired field buses installed in a plant, and the like. Wireless intelligent field device use wireless technology to perform transmission and reception. Typical examples of the wireless technologies include the wireless local-area-network technology (WiFi), a wireless sensor networking technology based on the Highway Addressable Remote Transducer Protocol (WirelessHART) and a wireless communication standard for industrial automation established by the International Society of Automation (ISA) 100.11a.

Information for measured value and information for measurement/actuating are embodied as parameters of field devices, hereinafter referred to as field device parameters. In some cases, the field device parameter is an object in a part of memory, a part of fieldbus communication frame, or a combination of both. For explanatory purpose, this disclosure mainly focuses on the self-diagnosis result of an intelligent field device. The self-diagnosis result is embodied in the field device parameters as well.

There are many vendors manufacturing different types of field devices. To ensure compatibility, the intelligent field devices are configured to function according to one of the standard communication protocols, such as Highway Addressable Remote Transducer (HART™), Foundation Fieldbus (FF), Process Field Bus (Profibus), and one for wireless field devices. A field device which uses the HART™ communication protocol will be hereinafter be referred to as a HART™ field device, one using Foundation Fieldbus is FF-H1 field device, Process Field Bus is Profibus field device, one using "Wireless Systems for Industrial Automation: Process Control and Related Applications (ISA100.11a)" technology is a ISA100 field device.

Plant Asset Management System

A plant asset management system typically may include, not limited to, equipment and field devices. The plant asset management system manage devices connected directly or indirectly to a control system or any other system such as a safety-instrumented system.

Field Network

Figure 1:
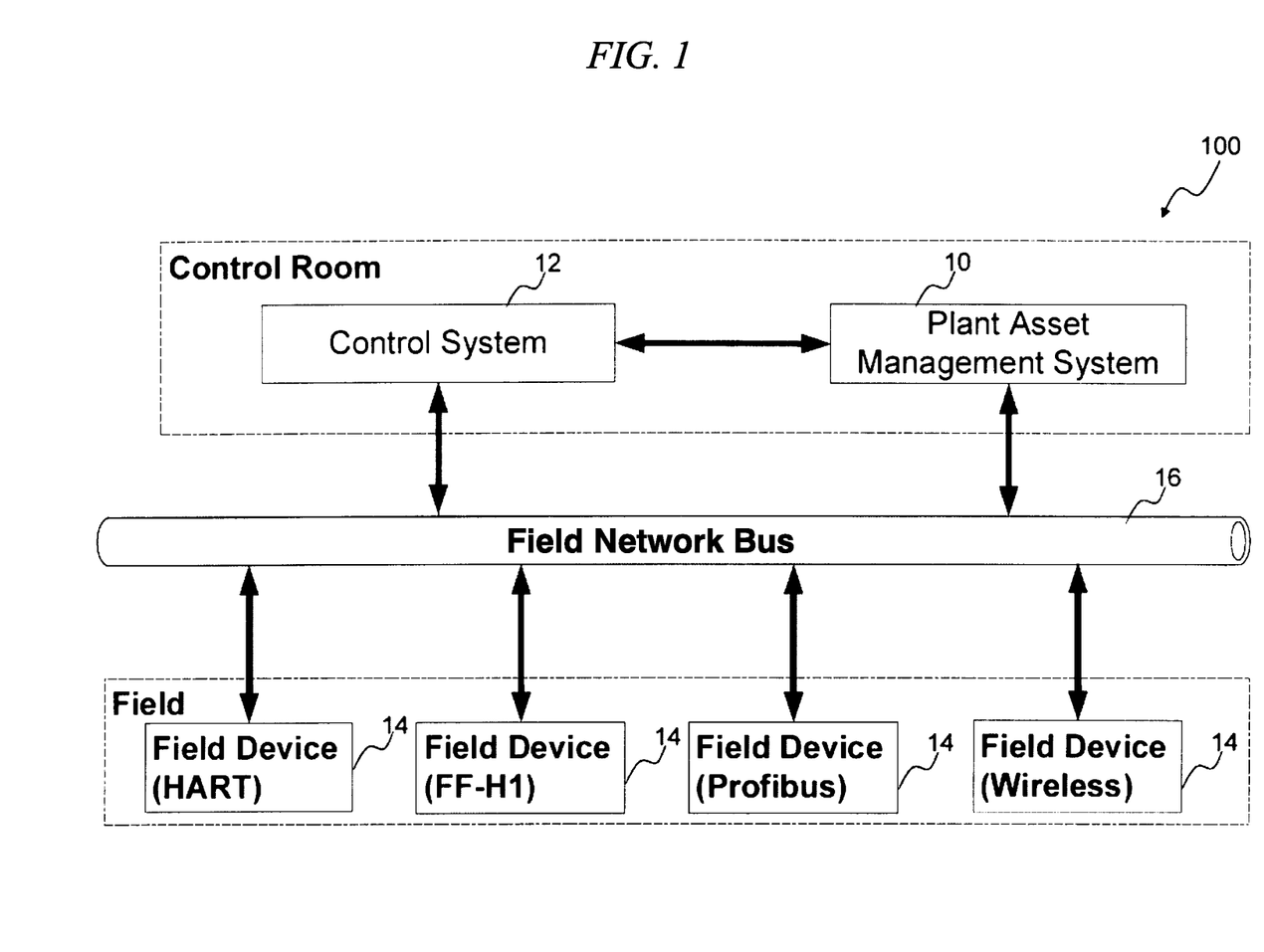
FIG. 1 is a block diagram of a field device management system in the related art.

FIG. 1 shows an example of a field network 100. A plant asset management system 10, a control system 12 and field devices 14 in an industrial plant are connected to a network bus 16 in the field network 100.

Figure 2:
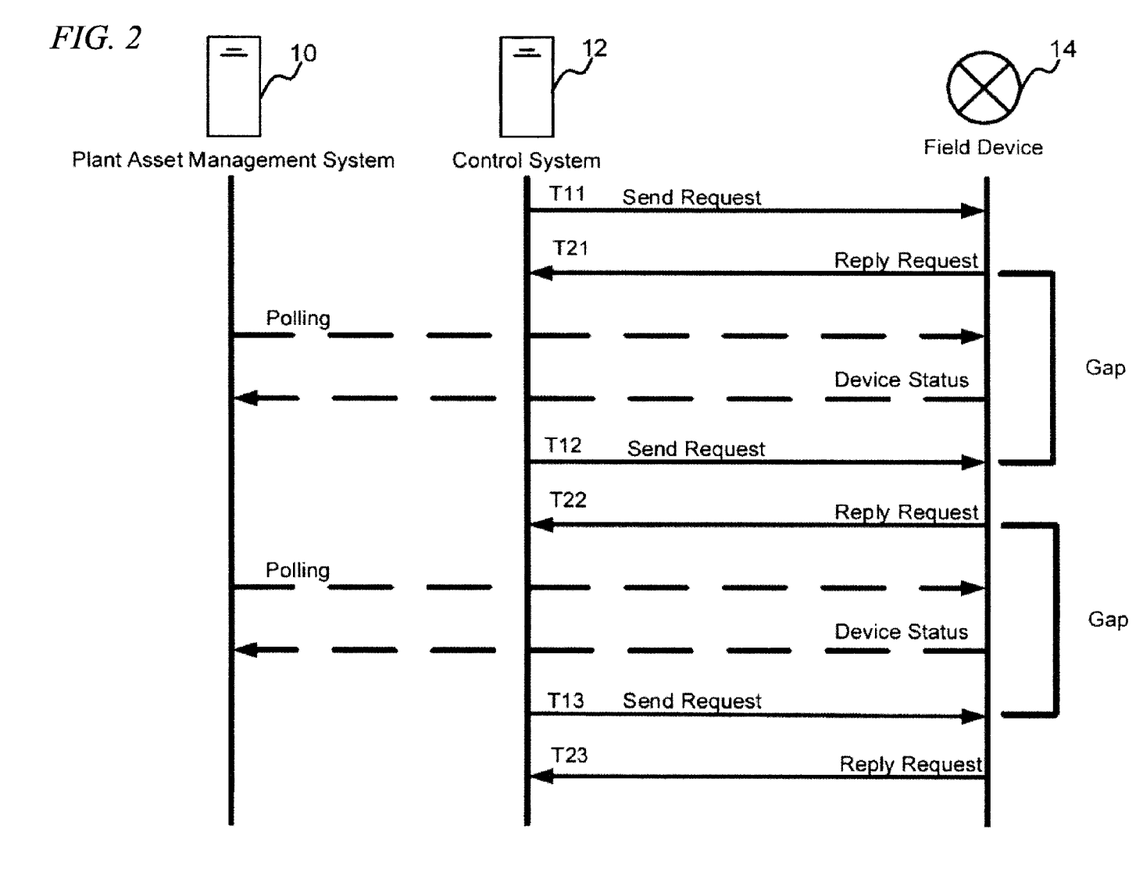
FIG. 2 is a timeline of communication in a network bus in the related art.

A typical control system 12 is configured to send requests to retrieve process variables from the field devices 14. The requests are sent at regular intervals based on a configuration. FIG. 2 shows an example timeline of requests sent at timings T11, T12, and T13 and the field device sends reply messages at timings T21, T22, and T23.

HART™ communication protocol is an example wherein communication between the control system and the field device includes an interactive protocol data unit, request and reply. According to HART™ communication protocol standard specification, during the communication between a request and a corresponding reply, no other communication can be performed, including a request from a different system. The HART™ communication protocol application in an industrial plant for a control system and field devices is described in Japan patent publications JP2003-186503 and JP2012-243008.

A user sends requests to retrieve diagnostic result through the plant asset management system for various purposes. However, requests sent from the plant asset management system are sent to the field device when the network bus is available. The control system has priority access to the network bus for communication. The network bus is available when there is no request from the control system. The network bus in the timeline of FIG. 2 is available during gaps, between receiving the reply corresponding to a previous request and before sending new requests. The request from the plant asset management system 10 is likely to be delayed or cancelled if the request has been in a queue for an extended period of time.

For HART™ field devices, a HART™ digital signal converter is required to convert digitalized variables from the HART™ field device to an analog current output. The digitalized variables issued by the HART™ device are in HART™ burst messages. The HART™ digital signal converter converts the variables in the HART™ burst messages. The variable is a process variable.

SUMMARY

A system includes, but not limited to, at least one processor, a retriever configured to retrieve a first field device parameter belonging to burst mode settings from at least one field device connected to a field network, and a transmitter. The transmitter is configured to transmit a second field device parameter belonging to burst mode settings to the at least one field device, based on at least a configuration file. The second field device parameter being associated with the first field device parameter. The first field device parameter includes, not limited to, a first determiner that determines whether to enable or disable a first automated transmission of a first process related variable of the field device, the first process related variable is one of a process variable and a diagnostic result in a burst mode. The retriever, the comparator and the transmitter are implemented by the at least one processor.

DETAILED DESCRIPTIONS

Reference will now be made in detail to the preferred embodiments of the invention, examples of which are illustrated in the accompanying drawings. While some aspects of the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed descriptions of the present invention, numerous specific details are set forth in order to provide a thorough understanding of the present invention. However, it will be obvious to one of ordinary skill of the art that the present invention may be practiced without these specific details. In other instances, well known methods, procedures, components, and features have not been described in detail as not to unnecessarily obscure aspects of the present invention.

Figure 3A:
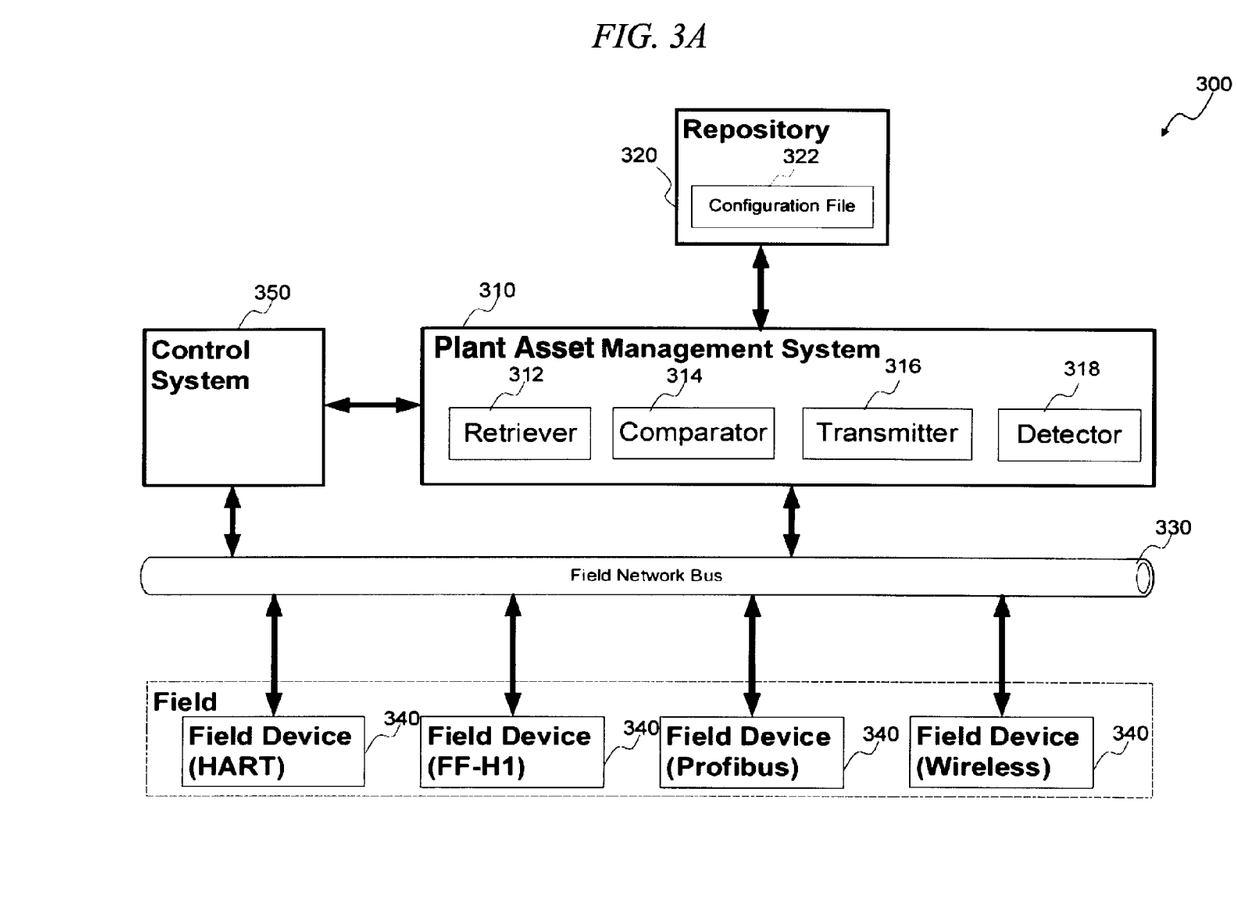
FIGS. 3A and 3B are block diagrams of a field management system according to some embodiments of the present invention.

FIG. 3A illustrates a field network 300 of an industrial plant. The field network 300 may include, but is not limited to, a plant asset management system 310, a repository 320, a field network bus 330, a plurality of field devices 340, and a control system 350.

The plant asset management system 310 is configured to communicate with the repository 320 and the field network bus 330. The repository 320 is a memory or storage external to or part of the plant asset management system 310. The repository 320 includes, not limited to, a configuration file 322. The configuration file 322 defines parameters for the field devices 340. The parameters are necessary for the field devices 340 to perform operations according to design specifications of the industrial plant.

The field network bus 330 is configured to transmit data among the plant asset management system 310, the field devices 340 and the control system 350. The field network bus 330 transmits data using a communication protocol such as HART™ field device, Foundation Fieldbus, Process Field Bus, and ISA100. The field network bus 330 supports multiple communication protocols according to some embodiments of the invention.

The plant asset management system 310 may include, but not limited to, a retriever 312, a comparator 314, a transmitter 316, and a detector 318. The retriever 312, the comparator 314 and the transmitter 316 are implemented by one or more processors and if any in combination with a memory or a storage.

The retriever 312 is configured to retrieve a first field device parameter belonging to burst mode settings from a field device 340 connected to the field network bus 330. "Belonging to" refers to being related or relevant. The first field device parameter is at least one parameter being used in the burst mode settings to enable or disable a burst mode. The comparator 314 is configured to compare the first field device parameter and a second field device parameter. The second field device parameter is in the configuration file 322. The second field device parameter is associated with the first field device parameter. The transmitter 316 is configured to transmit the second field device parameter to the field device 340.

The comparator 314 is configured to determine if the first field device parameter is identical to the second field device parameter. The transmitter 316 is configured to transmit the second field device parameter belonging to burst mode settings to the field device 340 when the comparator 314 determines that the first field device parameter is not identical to the second field device parameter according to some embodiments of the invention.

The first field device parameter is related to a first automated transmission from the field device. For the first automated transmission, the field device 340 transmits a first process related variable. The first process related variable is one of a process variable and a diagnostic result in burst mode. The first field device parameter variable determines if the first automated transmission is being enabled or disabled. The first field device parameter may include a determiner that determines whether to enable or disable the first automated transmission.

According to some embodiments of the invention, the retriever 312 is configured to retrieve a third field device parameter belonging to event notification settings from the field device 340. The third field device parameter is different from the first field device parameter. The third field device parameter is related to a second automated transmission from the field device 340. The third field device parameter may include a determiner that determines whether to enable or disable the second automated transmission. The transmitter 316 is configured to transmit the fourth field device parameter to the field device 340 when the fourth field device parameter is not identical to the third field device parameter.

The comparator 314 is configured to compare the values of the third field device parameter and a fourth field device parameter. The fourth field device parameter is a field device parameter in the configuration file 322 associated with the third field device parameter. The comparator 314 is configured to determine if the third field device parameter belonging to event notification settings is identical to the fourth field device parameter.

The transmitter 316 is configured to transmit the fourth field device parameter belonging to event notification settings to the field device 340 when the comparator 314 determines that the third field device parameter is not identical to the fourth field device parameter according to some embodiments of the invention. During the second automated transmission, the field device 340 transmits a second process related variable. The second process related variable is one of a process variable and a diagnostic variable as an event notification or in an event notification mode. The second process related variable is different from the first process related variable. The second automated transmission is performed at a timing different from the first automated transmission.

The retriever 312 is configured to receive, based on the first field device parameter, the first process related variable from the field device 340 in a predefined message format, when the first field device parameter defines the predefined message format as a message number. The field device 340 is enabled to transmit the first process related variable in the predefined message format. The field device 340 transmits a plurality of first process related variables, wherein the first process related variables are different from each other, according to some embodiments of the invention.

The retriever 312 is configured to receive, based on the first field device parameter, the first process related variable at a predetermined frequency, when the first field device parameter includes a definer that defines the predetermined frequency. The field device 340 is enabled to transmit the first process related variable periodically at predetermined intervals.

The retriever 312 is configured to receive, based on the first field device parameter, the first process related variable when a predefined condition is fulfilled. The first field device parameter defines the predefined condition. In an example, the predefined condition is a last diagnostic parameter (p) being different from a previous diagnostic parameter (p-1). The previous diagnostic parameter precedes the last diagnostic parameter. In another example, the predefined condition is a status change, the status change being due to difference between a last process related variable (x) and a preceding process related variable (x-1). Another example of the predefined condition is a falling or rising trend of a process related variable.

In an example for HART™ field device, the first automated transmission is performed in a burst mode. Burst mode settings include a plurality of field device parameters which are defined for the burst mode. In HART™ field device burst mode, the process value is transmitted. The retriever 312 is configured to retrieve the burst mode settings, for example, a first plurality of field device parameters from the field device 340. The transmitter 316 is configured to transmit the burst mode settings defined in the configuration file 322, for example, a second plurality of field device parameters, to the field device 340.

For HART™ field device, the second automated transmission is an event notification. Event notification settings include a plurality of field device parameters which are defined for the event notification. In HART™ field device event notification, the diagnostic result is transmitted. The retriever 312 is configured to retrieve event notification settings, for example, a third plurality of field device parameters from the field device 340. The transmitter 316 is configured to transmit the event notification settings defined in the configuration file 322, for example, a fourth plurality of field device parameters, to the field device 340.

The plant asset management system 310 includes the detector 318 according to some embodiments of the invention. The detector 318 is configured to detect that a field device 340 gets first connected to the network. The detector 318 retrieves a property of the field device 340 to determine a type of the field device 340. The property is a communication protocol of the field device 340 according to some embodiments of the invention. The retriever 312 is configured to retrieve the first field device parameter and the third field device parameter based on the type of the field device 340. The transmitter 316 is configured to transmit the second field device parameter and the fourth field device parameter based on the type of the field device 340.

Figure 3B:
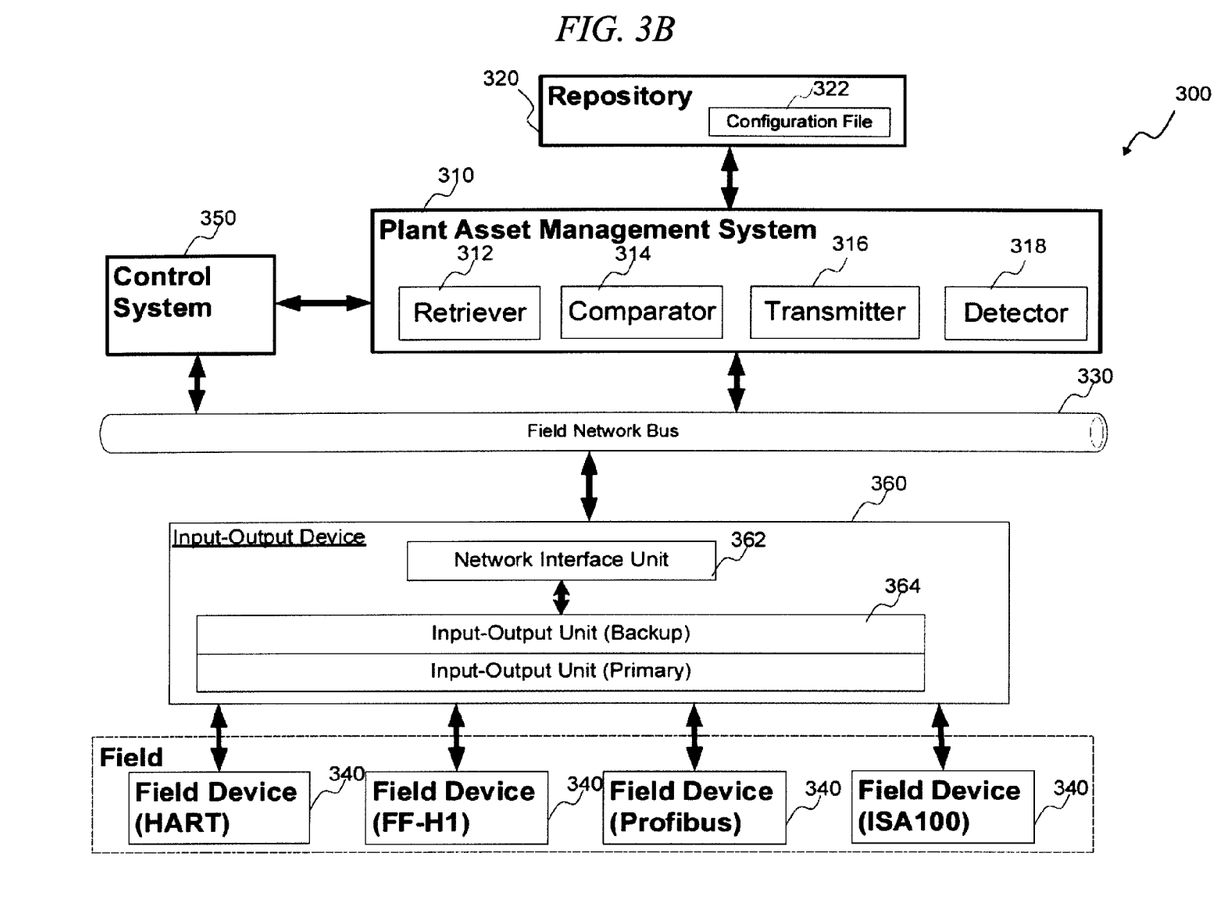

FIG. 3B illustrates a field device network 300 which includes an input-output (IO) device 360 connected to the field network bus 330. The IO device 360 may include, but not limited to, a network interface unit 362, an IO unit 364, a processor and a memory or storage. The IO unit 364 includes a primary IO unit and a backup IO unit according to some embodiments of the invention. Field devices 340 are connected to the IO unit 364. Communication between the plant asset management system 310 and the field devices 340 is transmitted through the IO device 360.

The retriever 312 is configured to retrieve the first field device parameter from the IO device 360. The IO device 360 transmits a request to the field device 340 for the first field device parameter. The IO device 360 stores parameters of the field device 340 in the memory or storage according to some embodiments of the invention.

Figure 4A:
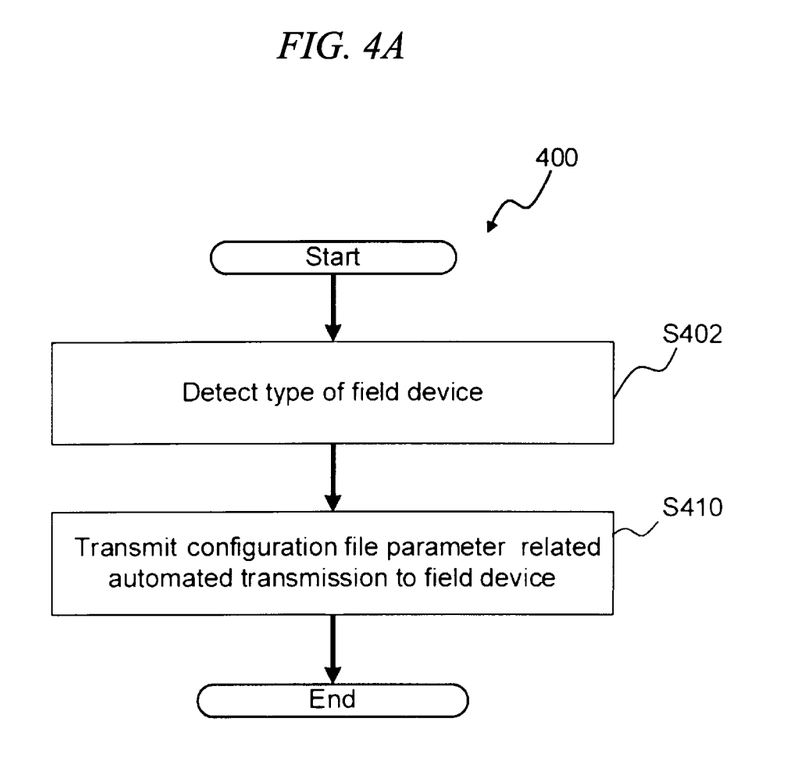
FIGS. 4A and 4B are workflows according to some embodiments of the present invention.

FIG. 4A illustrates a method 400 of some embodiments of the invention. In Step S402, the detector 318 retrieves a property of each of the field devices 340 connected to the field network bus 330 during a startup operation. The comparator 314 determines the type of the field device 340 based on the property. In Step S410, the transmitter 316 transmits a field device 340 parameter from the configuration file 322, based on the type of the field device 340, to the field device 340. The parameter of the field device 340 is related to an automated transmission of process related variable from the field device 340. The configuration file 322 defines the parameter of the field device 340 based on design specifications of the industrial plant. The parameter of the field device 340 should be consistent with the corresponding parameter in the configuration file.

Figure 4B:
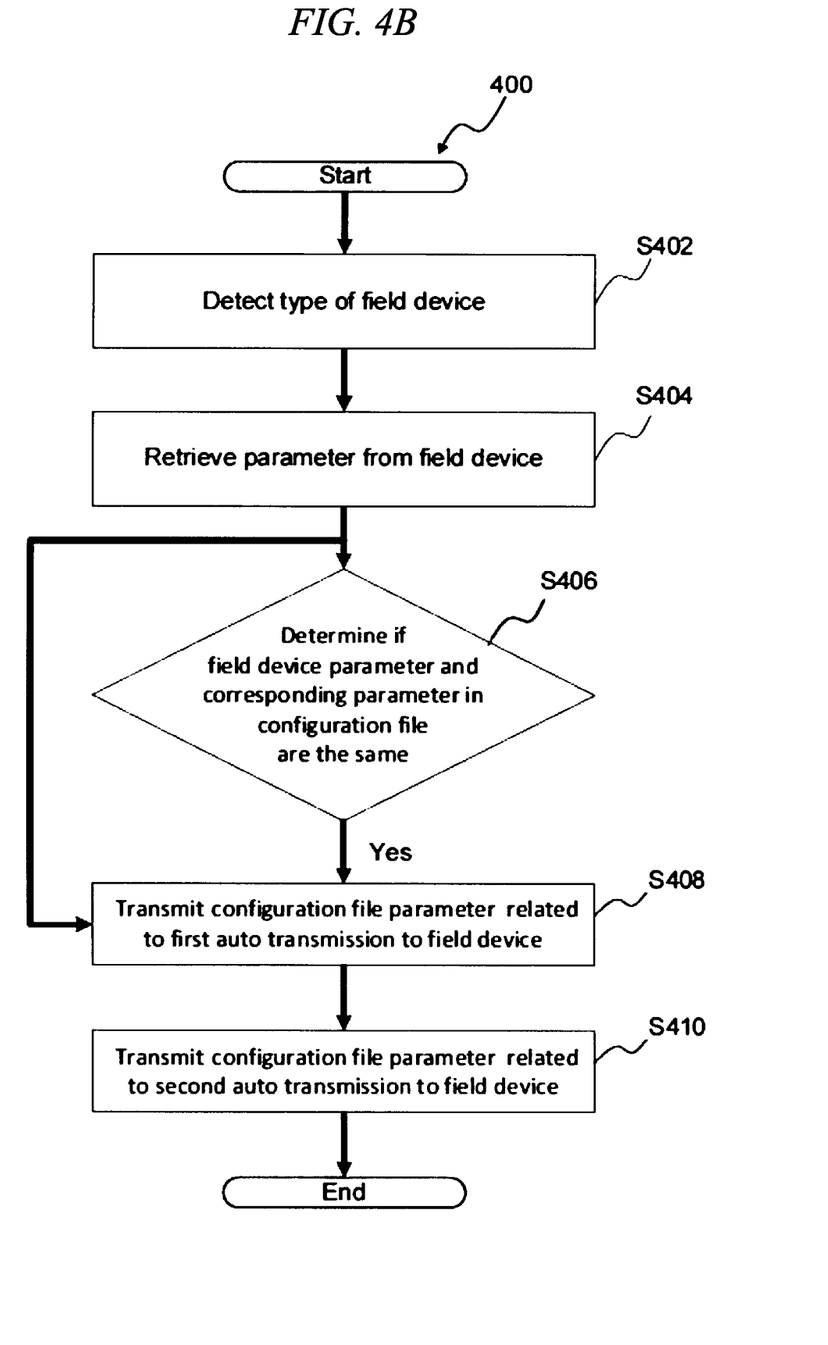

FIG. 4B illustrates a method 400 according to some embodiments of the invention. In Step S402, the detector 318 retrieves a property of each of the field devices 340 connected to the field network bus 330 during a startup operation. The detector 318 retrieves a property of a field device 340 which is newly connected to the field network bus 330. The comparator 314 determines the type of the field device 340 based on the property.

In Step S404, the retriever 312 retrieves a first field device parameter from the field device 340. The first field device parameter is determined based on the type of the field device 340.

In Step S406, the comparator 314 determines if the first field device parameter is identical to a second field device parameter in the configuration file 322. The second field device parameter defines if a first automated transmission from the field device 340 is to be enabled or disabled.

In Step S408, the transmitter 316 transmits the second field device parameter to the field device 340 when the comparator 314 determines that the first field device parameter is not identical to the second field device parameter. The configuration file 322 defines the parameter of the field device 340 based on design specifications of the industrial plant. The parameter of the field device 340 should be consistent with a corresponding parameter in the configuration file 322.

Step S406 is not performed according to some embodiments of the invention. In Step S408, the transmitter 316 transmits the second field device parameter to the field device 340. The second field device parameter determines if a first automated transmission from the field device 340 is to be enabled or disabled.

In Step S410, the transmitter 316 transmits a third field device parameter from the configuration file 322, based on the type of the field device 340, to the field device 340. The third field device parameter determines if a second automated transmission from the field device 340 is to be enabled or disabled. The second automated transmission is different from the first automated transmission.

The embodiments described above should not be restricted to a particular communication protocol or a particular type of the field device. The embodiments described above are applicable to HART™ field devices 340, FF-H1 field devices 340, Profibus field devices 340 and ISA100 field devices 340.

In an example of implementation method of the invention, in a design of the plant asset management system 310, the plant asset management includes receiving from HART™ field devices an automated transmission of process related variables, process variable, diagnostic result or a combination of both. The detector 318 retrieves the property which defines a communication protocol of the field device 340 to detect HART™ field devices 340.

Figure 5:
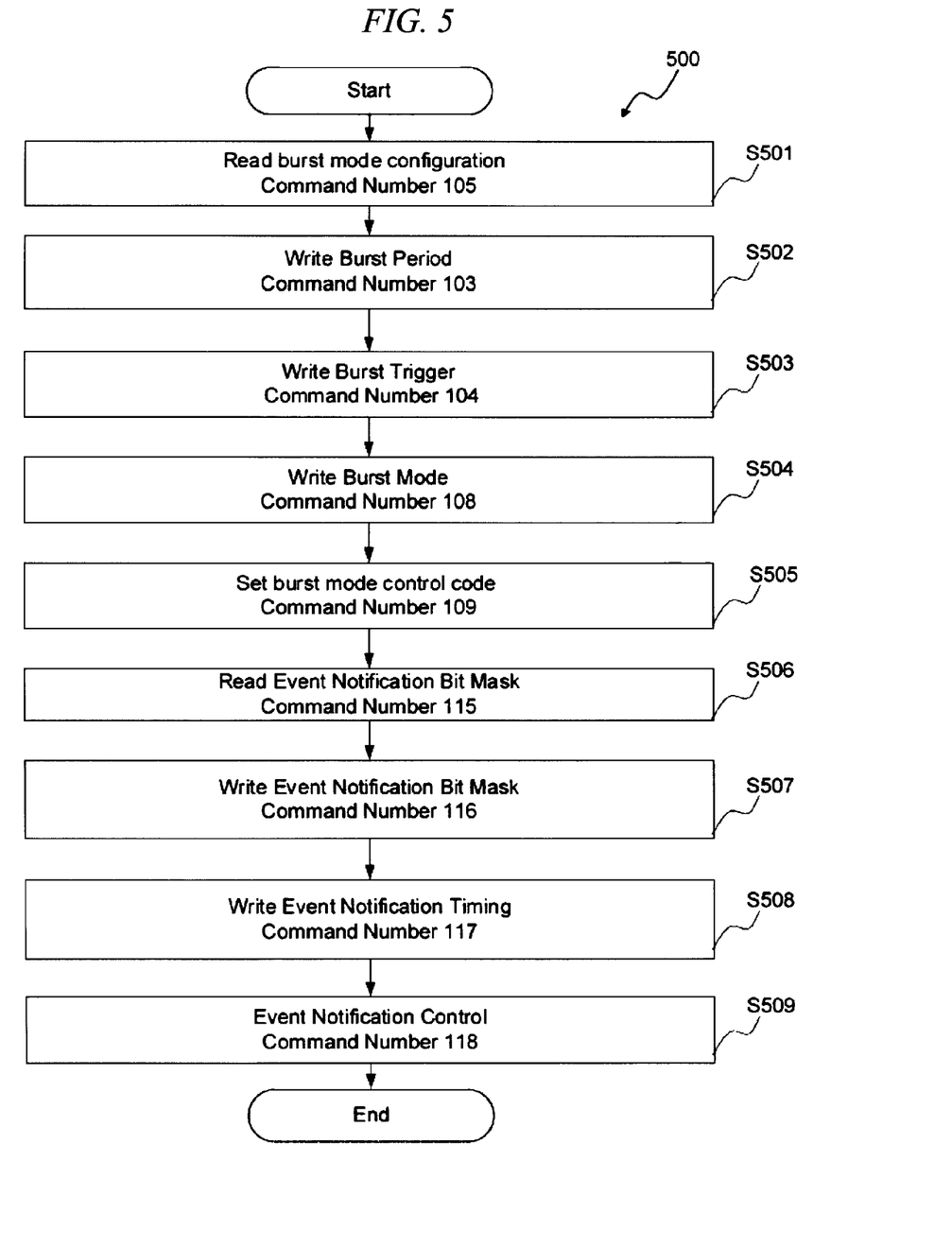
FIG. 5 is an example implementation workflow according to some embodiments of the present invention.

FIG. 5 shows an example of an implementation method 500 of the embodiments of the invention for HART™ field devices 340.

In S501, the transmitter 316 transmits command number 105 to the field device 340 when the detector 318 determines that the field device 340 is a HART™ field device.

Burst mode is a mode of a first automated transmission of the HART™ field device process variables. The retriever 312 retrieves a burst mode configuration based on the command number 105. The burst mode configuration is represented by a plurality of field device parameters relevant to the burst mode. Burst message is a reply from the field device 340 in the burst mode.

In S502, the transmitter 316 transmits command number 103 to define a burst period in the field device 340. Message number of the burst message is defined as "0" and an update period is defined as "0.5 seconds" to maximize the retrieval speed of process by the retriever 312. A maximum update period is sixty minutes, for example. The command number 103 can set one or more field device parameters, based on a communication protocol specification. The comparator 314 compares the one or more field device parameters required to be set by the command 103, and the comparison is done for the one or more field device parameters in the configuration file 322 and those retrieved in S501.

In S503, the transmitter 316 transmits command number 104 to define a burst trigger in the field device 340. Message number of the burst message is defined as "0" and a trigger mode is set to "0", which is a continuous mode. In this example, the predefined condition is a time interval of 0.5 seconds. The comparator 314 compares the one or more field device parameters required to be set by the command 104, and the comparison is done for the one or more field device parameters in the configuration file 322 and those retrieved in S501.

In S504, the transmitter 316 transmits command number 108 to define data in the burst message. Message number of the burst message is defined as "0" and data in the burst message is identical to a response message to command number 3. The data in the response message to command number 3 is a process value. Accordingly, the retriever 312 receives process values from the field device in the burst message. The comparator 314 compares the one or more field device parameters required to be set by the command 108, and the comparison is done for the one or more field device parameters in the configuration file 322 and those retrieved in S501.

In S505, the transmitter 316 transmits command number 109 to define a protocol data unit (PDU) control code of the burst message. The burst message PDU control code selects the protocol to issue the burst message PDU. Message number of the burst message is defined as "2" and Code "1" which is "Token Passing" for a HART™ field device. This enables field device 340 process value being informed in a token passing frame to ensure that the burst message is issued at 0.5 seconds interval. This is based on data link specification of HART™ protocol.

In S506, the retriever 312 retrieves event notification settings from the field device 340 by transmitting command number 115. Event notification settings are represented by a plurality of field device parameters relevant to the event notification mode. The event notification mode is a mode of a second automated transmission of the HART™ field device 340.

In S507, the transmitter 316 transmits the command number 116 to prepare an event notification bit mask. The event notification bit mask corresponds to a response message to command number 48, which may include, but not limited to, device status byte and additional device status byte. In the command number 116, the event number is defined as "0", and an event mask is either default setting or checks all bits. The field device 340 clears bits for the event notification message. The cleared bits are defined for "Cold Start" and "More status available" in a "device status part". The other field device bits retrieved using the command 115 are written to the event notification bit mask. The response message to command number 48 includes, not limited to, diagnosis result of the field device 340. Accordingly, the event notification bit mask includes a diagnosis result of the field device 340. The comparator 314 compares the one or more field device parameters required to be set by the command 116, and the comparison is done for the one or more field device parameters in the configuration file 322 and those retrieved in S506.

In S508, the transmitter 316 transmits a command number 117 to define a timing of the event notification. The event number is defined as "0", retry time "32 seconds", maximum update time "60 minutes and de-bounce interval "0.5 seconds". The event notification bit mask is sent from the field device 340 within "0.5 seconds" when a change in the diagnosis result is detected. The comparator 314 compares the one or more field device parameters required to be set by the command 117, and the comparison is done for the one or more field device parameters in the configuration file 322 and those retrieved in S506.

In S509, the transmitter 316 transmits a command number 118 to define a control for the event notification. An event number is defined as "1" and Code "1" which is "Token Passing" for a HART™ field device 340. This enables the diagnostic result of the field device 340 being informed in a token passing frame to ensure that the burst message is issued at a 0.5 seconds interval. This is based on data link specification of HART™ protocol. The comparator 314 compares the one or more field device parameters required to be set by the command 118, and the comparison is done for the one or more field device parameters in the configuration file 322 and those retrieved in S506.

Figure 6:
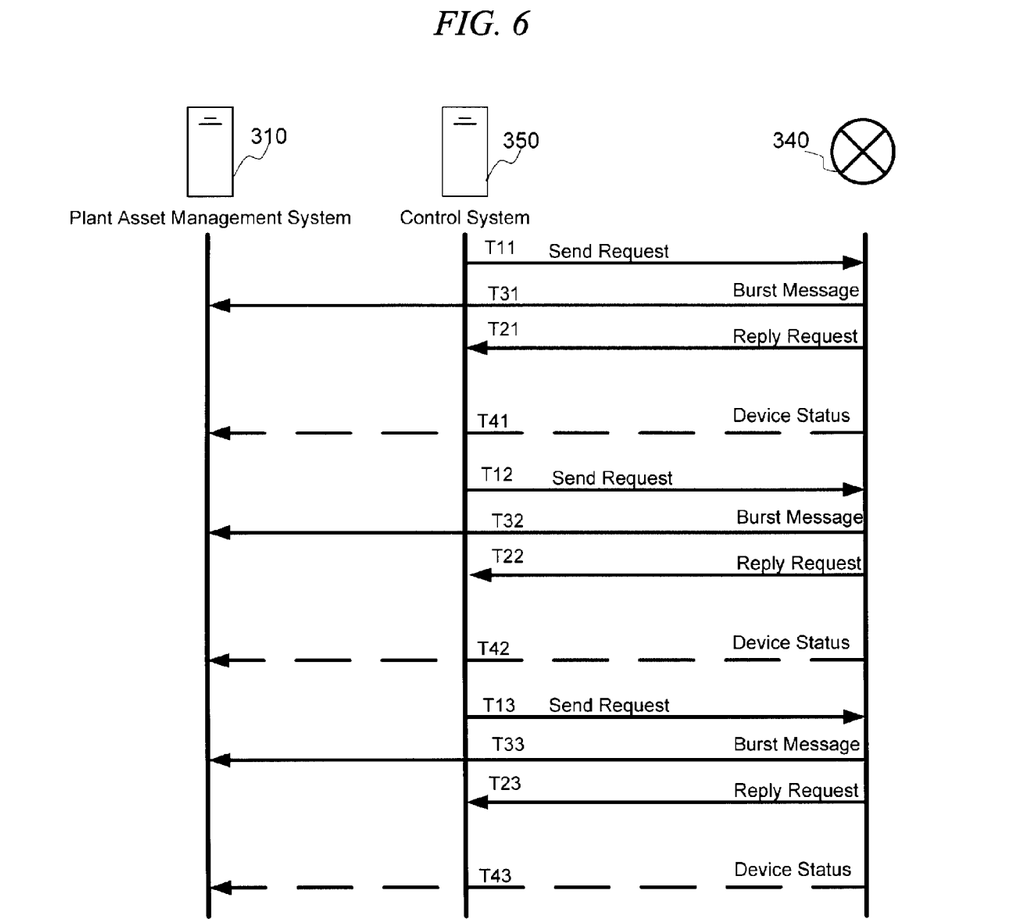
FIG. 6 is a timeline of communication in a network bus according to some embodiments of the present invention.

FIG. 6 shows an example of the timeline of communication in the field network bus 330 according to some embodiments of the invention. The disclosure describes a system and a method to define parameters in the field device 340 to enable a first automated transmission and a second automated transmission of process value and diagnostic result from the field device 340. In an example for HART™ field device 340, the burst mode is a mode of the first automated transmission and the event notification is a notification of the second automated transmission. The system and method in the disclosure enables the burst messages in the burst mode to be sent at timings T31, T32, and T33, and the event notification bit masks in event notification sent at timings T41, T42, and T43.

This is advantageous over prior art since there is no need to poll data, process values or diagnostic result, from field devices 340. A status change in the field device 340 is detected immediately by the plant asset management system 310.

A system includes, but not limited to, at least one processor, a retriever and a transmitter. The retriever is configured to retrieve a first field device parameter belonging to burst mode settings from at least one field device connected to a field network, The transmitter is configured to transmit a second field device parameter belonging to burst mode settings to the at least one field device, based on at least a configuration file. The second field device parameter is associated with the first field device parameter. The first field device parameter includes, not limited to, a first determiner that determines whether to enable or disable a first automated transmission of a first process related variable of the field device, the first process related variable is one of a process variable and a diagnostic result in a burst mode. The retriever, the comparator and the transmitter are implemented by the at least one processor.

The retriever is configured to retrieve a third field device parameter belonging to event notification settings from the at least one field device, the third field device parameter is different from the first field device parameter. The transmitter is configured to transmit a fourth field device parameter belonging to event notification settings to the field device, based on the at least configuration file, the fourth field device parameter is associated with the first device parameter. The third field device parameter includes, but not limited to, a second determiner that determines whether to enable or disable a second automated transmission of a second process related variable of the field device. The second process related variable is one of a process variable and a diagnostic result in an event notification, the second process related variable is different from the first process related variable.

The system further includes, but not limited to, a comparator configured to determine if the retrieved first field device parameter is identical to the second field device parameter. The comparator is implemented by the at least one processor. The transmitter is configured to transmit the second field device parameter to the field device when the comparator determines that the first field device parameter is not identical to the second field device parameter.

The comparator is configured to determine if the retrieved third field device parameter is identical to the fourth field device parameter. The comparator is implemented by the at least one processor. The transmitter is configured to transmit the fourth field device parameter to the field device when the comparator determines that the third field device parameter is not identical to the fourth field device parameter.

The transmitter is configured to communicate with an input-output (IO) unit, through which the at least one field device is allowed to communicate to the field network. The retriever is configured to retrieve, from the IO unit, IO unit parameters. The comparator is configured to determine, based on at least the retrieved IO unit parameters from the IO unit, if the IO unit is configured to perform the first automated transmission from the at least one field device. The IO unit is implemented by the at least one processor.

The transmitter is configured to communicate with an input-output (IO) unit, through which the at least one field device is allowed to communicate to the field network. The retriever is configured to retrieve, from the IO unit, IO unit parameters. The comparator is configured to determine, based on at least the retrieved IO unit parameters from the IO unit, if the IO unit is configured to perform the second automated transmission from the at least one field device. The IO unit is implemented by the at least one processor.

The first parameter is one of a message number, an update period and a transmission mode as a burst trigger.

The system further includes, but not limited to, a detector configured to determine a type of a first field device when the first field device is connected to the field network. The detector is implemented by the at least one processor.

The system further includes, but not limited to, a generator configured to generate an alert to a user interface when the comparator determines that the first parameter value is not identical to the second parameter value. The generator is implemented by the at least one processor.

The system is configured to communicate with a repository that stores the at least definition file.

A system includes, but not limited to, at least one processor, a detector, a retriever and a transmitter. The detector is configured to determine a type of a field device when the field device is connected to a field network. The retriever is configured to retrieve, based on the type of the field device determined by the detector, a first field device parameter belonging to burst mode settings from the field device. The transmitter is configured to transmit the first field device parameter in the configuration file to the first field device in case that the first field device parameter includes, but not limited to, a first determiner that determines whether to enable or disable a first automated transmission of a first process related variable from the field device, and that the first process related variable is one of a process variable and a diagnostic result in a burst mode. The detector, the retriever, the comparator and the transmitter are implemented by the at least one processor.

The system further includes, but not limited to, a comparator. The retriever is configured to retrieve a second field device parameter belonging to event notification settings from the field device, the second field device parameter is different from the first field device parameter. The comparator is configured to determine, from the configuration file, if the second field device parameter includes, but not limited to, a second determiner that determines whether to enable or disable a second automated transmission of a second process related variable of the field device. The second process related variable is one of a process variable and a diagnostic variable, the second process related variable is different from the first process related variable. The transmitter is configured to transmit the second field device parameter in the configuration file to the second field device when the comparator determines that the second field device parameter includes, but not limited to, the second determiner that determines whether to enable or disable the second automated transmission.

The system further includes, but not limited to, a comparator. The transmitter is configured to communicate with an input-output (IO) unit connected to the field network. The retriever is configured to retrieve, from the IO unit, IO unit parameters. The comparator is configured to determine, based on at least the retrieved IO unit parameters from the IO unit, if the IO unit is configured to perform the first automated transmission from the first field device. The IO unit is implemented by the at least one processor.

The transmitter is configured to communicate with an input-output (IO) unit connected to the field network. The retriever is configured to retrieve, from the IO unit, IO unit parameters. The comparator is configured to determine, from the IO unit parameters, if the IO unit is configured to perform the second automated transmission from the at least one field device. The IO unit is implemented by the at least one processor.

The retriever is configured to receive, based on the first field device parameter, the first process related variable in a predefined message format, when the first field device parameter includes, but not limited to, a first definer that defines the predefined message format.

The retriever is configured to receive, based on the first field device parameter, the first process related variable at a predetermined frequency, when the first field device parameter includes, but not limited to, a second definer that defines the predetermined frequency.

A non-transitory computer readable medium that stores a computer program to be executed by at least one or more processors in a system configured to manage at least one field device. The computer program includes, but not limited to, codes for retrieving a first field device parameter belonging to burst mode settings from the at least one field device connected to a field network; determining, from a configuration file in a repository, if the retrieved first field device parameter is identical to a second field device parameter belonging to burst mode settings in the configuration file, the second field device parameter in the configuration file is associated with the first field device parameter in the field device; and transmitting the second field device parameter to the field device when the comparator determines that the first field device parameter is not identical to the second field device parameter. The first field device parameter includes, but not limited to, a first determiner that determines whether to enable or disable a first automated transmission of a first process related variable of the field device, the first process related variable is one of a process variable and a diagnostic variable.

The computer program further includes, but not limited to, codes for retrieving a third field device parameter belonging to event notification settings; and transmitting the third field device parameter, based on the configuration file, to the field device. The third field device parameter includes, but not limited to, a second determiner that determines whether to enable or disable a second automated transmission of a first process related variable of the field device. The first process related variable is one of a process variable and a diagnostic variable. The second automated transmission is different from the first automated transmission and the third field device parameter is different from the first and second field device parameters.

The systems and methods in the above-described embodiments may be deployed in part or in whole through a machine that executes computer software, software components, program codes, and/or instructions on one or more processors. The one or more processors may be part of a general-purpose computer, a server, a cloud server, a client, network infrastructure, mobile computing platform, stationary computing platform, or other computing platform. One or more processors may be any kind of computational or processing device or devices which are capable of executing program instructions, codes, binary instructions and the like. The one or more processors may be or include a signal processor, digital processor, embedded processor, microprocessor or any variants such as a co-processor, for example, math co-processor, graphic co-processor, communication co-processor and the like that may directly or indirectly facilitate execution of program codes or program instructions stored thereon. In addition, the one or more processors may enable execution of multiple programs, threads, and codes. The threads may be executed simultaneously to enhance the performance of the one or more processors and to facilitate simultaneous operations of the application. Program codes, program instructions and the like described herein may be implemented in one or more threads. The one or more processors may include memory that stores codes, instructions and programs as described herein. The processor may access a non-transitory processor-readable storage medium through an interface that may store codes, instructions and programs as described herein and elsewhere. The non-transitory processor-readable storage medium associated with the processor for storing programs, codes, program instructions or other type of instructions capable of being executed by the computing or processing device may include but may not be limited to one or more of a memory, hard disk, flash drive, RAM, ROM, CD-ROM, DVD, cache and the like.

A processor may include one or more cores that may enhance speed and performance of a multiprocessor. In some embodiments, the process may be a dual core processor, quad core processors, other chip-level multiprocessor and the like that combine two or more independent cores.

The methods and systems described herein may be deployed in part or in whole through a machine that executes computer software on a server, client, firewall, gateway, hub, router, or other such computer and/or networking hardware.

The software program may be associated with one or more client that may include a file client, print client, domain client, internet client, intranet client and other variants such as secondary client, host client, distributed client and the like. The client may include one or more of memories, processors, computer readable media, storage media, physical and virtual ports, communication devices, and interfaces capable of accessing other clients, servers, machines, and devices through a wired or a wireless medium, and the like. The programs or codes as described herein may be executed by the client. In addition, other devices required for execution of methods as described in this application may be considered as a part of the infrastructure associated with the client. The client may provide an interface to other devices including servers, other clients, printers, database servers, print servers, file servers, communication servers, distributed servers and the like. This coupling and/or connection may facilitate remote execution of program across the network. The networking of some or all of these devices may facilitate parallel processing of a program or method at one or more location. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The software program may be associated with one or more servers that may include a file server, print server, domain server, internet server, intranet server and other variants such as secondary server, host server, distributed server and the like. The server may include one or more of memories, processors, computer readable media, storage media, physical and virtual ports, communication devices, and interfaces capable of accessing other servers, clients, machines, and devices through a wired or a wireless medium, and the like. The methods, programs or codes as described herein may be executed by the server. In addition, other devices required for execution of methods as described in this application may be considered as a part of the infrastructure associated with the server. The server may provide an interface to other devices including clients, other servers, printers, database servers, print servers, file servers, communication servers, distributed servers, social networks, and the like. This coupling and/or connection may facilitate remote execution of program across the network. The networking of some or all of these devices may facilitate parallel processing of a program or method at one or more locations. Any of the devices attached to the server through an interface may include at least one storage medium capable of storing programs, codes and/or instructions. A central repository may provide program instructions to be executed on different devices. In this implementation, the remote repository may act as a storage medium for program codes, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing devices associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory, for example, USB sticks or keys, floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The modules, engines, components, and elements described herein, including in flow charts and block diagrams throughout the figures, imply logical boundaries between the modules, engines, components, and elements. However, according to software or hardware engineering practices, the modules, engines, components, and elements and the functions thereof may be implemented on one or more processors, computers, machines through computer executable media, which are capable of executing program instructions stored thereon as a monolithic software structure, as standalone software modules, or as modules that employ external routines, codes, services, or any combination of these, and all such implementations may be within the scope of the present disclosure. Examples of such machines may include, but is not limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, processor-embedded eyewear and the like. Furthermore, the modules, engines, components, and elements in the flow chart and block diagrams or any other logical component may be implemented on one or more machines, computers or processors capable of executing program instructions. Whereas the foregoing descriptions and drawings to which the descriptions have been referred set forth some functional aspects of the disclosed systems, no particular arrangement of software for implementing these functional aspects should be inferred from these descriptions unless explicitly stated or otherwise clear from the context. It will also be appreciated that the various steps identified and described above may be varied, and that the order of steps may be adapted to particular applications of the techniques disclosed herein. All such variations and modifications are intended to fall within the scope of this disclosure. The descriptions of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the present disclosure includes many embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

What is claimed is:

1. A system comprising:
a communication network configured for allowing a communication in an industrial plant communication protocol;
a repository that stores at least one configuration file which defines one or more parameters necessary for a field device in an industrial plant to perform operations according to design specifications of the industrial plant;
a control system configured to communicate via the communication network in the industrial plant communication protocol with a field device in the industrial plant and to control the field device;
a plant asset management system configured to be connected to the control system and to manage the control system, the plant asset management system configured to communicate via the communication network in the industrial plant communication protocol with a field device in parallel to the control system; the plant asset management system configured to be connected to the repository to obtain the at least one configuration file;
the plant asset management system further comprising:
a detector configured to detect that the field device gets connected to the communication network, the detector configured to retrieve a property of the field device, the detector configured to determine a type of the field device, based on the property retrieved, wherein the property is the industrial plant communication protocol of the field device;
a retriever configured to retrieve, based on the type of the field device that the detector determined, a first field device parameter belonging to burst mode settings from at least one field device connected to a field network, wherein the first field device parameter is used in the burst mode settings to enable or disable a burst mode, the first field device parameter comprises a first determiner that determines whether to enable or disable a first automated transmission of a first process related variable of the field device, the first process related variable is one of a process variable and a diagnostic result in a burst mode;
a comparator configured to compare the first field device parameter and a second field device parameter, wherein the second field device parameter is in the configuration file, and the second field device parameter is associated with the first field device parameter, the comparator configured to determine if the retrieved first field device parameter is identical to the second field device parameter; and
a transmitter configured to transmit, based on the type of the field device that the detector determined, the second field device parameter belonging to burst mode settings to the at least one field device, if the comparator determined that the first field device parameter is not identical to the second field device parameter,
wherein the control system and the plant asset management system are implemented by at least one processor.

2. The system in claim 1, wherein
the retriever is configured to retrieve a third field device parameter belonging to event notification settings from the at least one field device, the third field device parameter is different from the first field device parameter; and
the transmitter is configured to transmit a fourth field device parameter belonging to event notification settings to the field device, based on the at least configuration file, the fourth field device parameter is associated with the first device parameter,
wherein the third field device parameter comprises a second determiner that determines whether to enable or disable a second automated transmission of a second process related variable of the field device, wherein the second process related variable is one of a process variable and a diagnostic result in an event notification the second process related variable is different from the first process related variable.

3. The system in claim 2, wherein
the comparator is configured to determine if the retrieved third field device parameter is identical to the fourth field device parameter, wherein the comparator is implemented by the at least one processor; and
wherein the transmitter is configured to transmit the fourth field device parameter to the field device when the comparator determines that the third field device parameter is not identical to the fourth field device parameter.

4. The system in claim 2, wherein the transmitter is configured to communicate with an input-output (IO) unit, through which the at least one field device is allowed to communicate to the field network,
wherein the retriever is configured to retrieve, from the IO unit, IO unit parameters; and
wherein the comparator is configured to determine, based on at least the retrieved IO unit parameters from the IO unit, if the IO unit is configured to perform the second automated transmission from the at least one field device wherein the IO unit is implemented by the at least one processor.

5. The system in claim 1, further comprising:
wherein the transmitter is configured to communicate with an input-output (IO) unit, through which the at least one field device is allowed to communicate to the field network,
wherein the retriever is configured to retrieve, from the IO unit, IO unit parameters;
wherein the comparator is configured to determine, based on at least the retrieved IO unit parameters from the IO unit, if the IO unit is configured to perform the first automated transmission from the at least one field device, and
wherein the IO unit is implemented by the at least one processor.

6. The system in claim 1, wherein the first parameter is one of a message number, an update period and a transmission mode as a burst trigger.

7. The system in claim 1, further comprising:
a generator configured to generate an alert to a user interface when the comparator determines that the first parameter value is not identical to the second parameter value,
wherein the generator is implemented by the at least one processor.

* * * * *